(12) United States Patent
Lenk

(10) Patent No.: US 8,438,828 B2
(45) Date of Patent: May 14, 2013

(54) FLOW DIVIDER HAVING BREAKING POINTS FOR A FAN ENGINE

(75) Inventor: Olaf Lenk, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 720 days.

(21) Appl. No.: 12/631,521

(22) Filed: Dec. 4, 2009

(65) Prior Publication Data

US 2010/0139241 A1 Jun. 10, 2010

(30) Foreign Application Priority Data

Dec. 5, 2008 (DE) .......................... 10 2008 060 489

(51) Int. Cl.
*F02G 3/00* (2006.01)
*F02K 3/02* (2006.01)
*F02C 7/00* (2006.01)
*F01B 25/16* (2006.01)
*B01D 39/00* (2006.01)

(52) U.S. Cl.
USPC ............. 60/39.092; 60/226.1; 60/779; 415/9; 415/121.2; 55/306

(58) Field of Classification Search ............... 60/39.092, 60/226.1, 779; 415/9, 121.2, 144, 208.1; 55/306; 137/15.1, 15.2; 244/53 B
See application file for complete search history.

(56) References Cited

U.S. PATENT DOCUMENTS

| | | | |
|---|---|---|---|
| 3,375,971 A * | 4/1968 | Fitton ........................ | 415/209.4 |
| 3,832,086 A | 8/1974 | Hull, Jr. et al. | |
| 4,055,041 A * | 10/1977 | Adamson et al. ............ | 60/226.1 |
| 4,249,859 A | 2/1981 | Benyi et al. | |
| 4,474,346 A * | 10/1984 | Murphy et al. ................. | 244/54 |
| 4,685,942 A | 8/1987 | Klassen et al. | |
| 4,722,184 A * | 2/1988 | Chaplin et al. ............... | 60/226.1 |
| 5,039,317 A | 8/1991 | Thompson et al. | |
| 6,209,679 B1 * | 4/2001 | Hogeboom et al. .......... | 181/286 |
| 7,266,941 B2 * | 9/2007 | Eleftheriou et al. ......... | 60/226.1 |
| 7,618,232 B2 | 11/2009 | Bil et al. | |
| 7,992,823 B2 * | 8/2011 | Rainous et al. ........... | 244/134 E |
| 8,245,981 B2 * | 8/2012 | Rainous et al. ............ | 244/200.1 |

(Continued)

FOREIGN PATENT DOCUMENTS

| | | |
|---|---|---|
| DE | 2256972 | 4/1982 |
| DE | 3345957 | 6/1984 |

(Continued)

OTHER PUBLICATIONS

European Search Report dated Jul. 3, 2012 from counterpart application.

*Primary Examiner* — Phutthiwat Wongwian
*Assistant Examiner* — Michael B Mantyla
(74) *Attorney, Agent, or Firm* — Timothy J. Klima; Shuttleworth & Ingersoll, PLC

(57) ABSTRACT

A flow divider (1) for a fan engine which forms an annular leading edge (4) simultaneously on the outer circumference of an annular core air duct and the inner circumference of an annular secondary air duct, protrudes into the fan airflow and has an aerodynamic profile. In order to avoid blockage of the core air and/or secondary air ducts in the event of destruction or detachment of the flow divider (1), the flow divider features separable parts (6) which, whatever their orientation, are capable of passing the vane passages of the core air duct and the secondary air duct.

25 Claims, 2 Drawing Sheets

U.S. PATENT DOCUMENTS

Figure 1A:
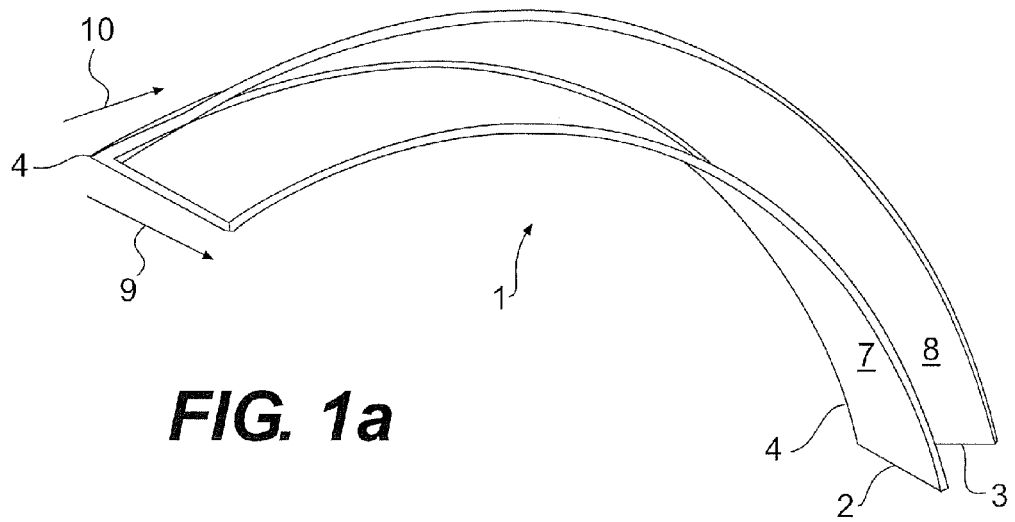

| | | |
|---|---|---|
| 2008/0075587 A1* | 3/2008 | Lenk et al. .................... 415/200 |
| 2008/0216300 A1 | 9/2008 | Anderson et al. |
| 2009/0165995 A1 | 7/2009 | Bajusz et al. |

FOREIGN PATENT DOCUMENTS

| | | |
|---|---|---|
| DE | 69112216 | 3/1996 |
| EP | 1757796 | 2/2007 |
| EP | 1942249 | 7/2008 |
| EP | 2075194 | 7/2009 |
| WO | 2009/142793 | 11/2009 |

* cited by examiner

FLOW DIVIDER HAVING BREAKING POINTS FOR A FAN ENGINE

This application claims priority to German Patent Application DE102008060489.5 filed Dec. 5, 2008, the entirety of which is incorporated by reference herein.

This invention relates to a flow divider for a fan engine and a method for increasing the operational safety of a fan engine by use of a flow divider.

Presently almost all civil jet engines employ bypass technology for thrust generation. Here, a core airflow is processed through a thermodynamic cycle in the core engine (compressor, combustion chamber, turbine), while a secondary airflow delivers the propulsive power.

Since core airflow and secondary airflow enter the jet engine (fan engine) together through a fan stage, the two airflows have to be divided. Division is accomplished by a flow divider which for this purpose is provided with an aerodynamic profile.

Such a flow divider includes a mostly V-shaped profile in a metallic material which is connected to the engine structure via fasteners. In normal operation, the profile is subject to low aerodynamic loads. Design criterion is the damage case in which foreign objects enter the fan engine and impinge onto the flow divider.

For the flow divider, which normally is subject to low loads, a metallic material is used which, due to the stability required, has high weight.

The design is based on the principle that the flow divider shall not be destroyed or detached in the case of damage. The background here is that a detached flow divider, or fragments forming during destruction, can block the vane passages of the core air duct and/or the secondary air duct, leading to a decrease in performance of the fan engine.

Specification US 2008/0216300 A1 discloses a method for the repair of a flow divider. Here, the worn section of the flow divider situated in the inflow area is removed. Then, a replacement ring is welded to the remaining part of the flow divider and reworked to provide it with the shape of the original section in the inflow area.

This repair method is of complex nature and does not prevent the flow divider, or fragments forming during destruction, from detaching and blocking the vane passage.

A broad aspect of the present invention is to avoid blockage of the core air and/or secondary air ducts in the event of destruction or detachment of the flow divider.

It is a particular object of the present invention to provide a flow divider for a fan engine which forms an annular leading edge simultaneously on the outer circumference of an annular core air duct and the inner circumference of an annular secondary air duct, protrudes into the fan airflow and has an aerodynamic profile. The flow divider features separable parts which, whatever their orientation, are capable of passing the vane passages of the core air duct and the secondary air duct.

In order to prevent the core air duct and/or the secondary air duct from being blocked in the case of damage (destruction and/or detachment of the flow divider), the separated parts of the flow divider shall not catch in the array of the exit guide vanes of the secondary air duct or the array of inlet guide vanes of the core air duct, respectively.

On the basis of the number of guide vanes, their dimensioning and aerodynamic profiling, a maximum size of the parts separable from the flow divider is defined which should pass with the engine flow through the vane arrays of the fan engine. Consequently, the separable parts of the flow divider are dimensioned such that they will not exceed this maximum size, but, whatever their orientation, pass the vane passages of the core air duct and the secondary air duct.

Thus, safe operation of the fan engine is ensured also in damage cases. Provision is herewith made for the installation of largely segmented flow dividers, reducing the manufacturing, assembly and logistic effort.

More particularly, the flow divider is provided with predetermined breaking points by which the separable parts are limited and the size of the separable parts is defined. Provision is thus made for the control of the maximum size of the separable parts of the flow divider. The number and position of the predetermined breaking points is adapted to the requirements on the maximum size of the separable parts. Here, the thickness of the predetermined breaking points is variable.

Preferably, the predetermined breaking points are arranged on the surface of the flow divider. Such a form of predetermined breaking points is particularly easily producible.

The predetermined breaking points can be arranged essentially along the flow direction. This arrangement of the predetermined breaking points provides that the separable parts each form circular ring segments and the remainder of the flow divider retains its shape.

Alternatively, the predetermined breaking points can be arranged essentially at an angle to the flow direction. This arrangement enables the shape of the separated parts and of the remainder of the flow divider to be varied.

In a preferred embodiment, the flow divider has an essentially V-shaped cross-section, and the predetermined breaking points are arranged in the interior of the V-shaped cross-section. This form is easily and cost-effectively producible and has low weight. Arrangement of the predetermined breaking points on the inner surface of the V-shaped cross-section prevents the core airflow and the secondary airflow on the outer surface of the flow divider from being disturbed.

Preferably the flow divider is made of a fiber-composite material or of a plastic material. These materials feature low weight and are cost-effectively producible.

It is a further object of the present invention to provide a method for increasing the operational safety of a fan engine by use of a flow divider. Upon entry of at least one foreign object into the fan engine and impingement of the foreign object on the flow divider, at least one defined, separable part of the flow divider is detached.

By use of this method, safe operation of the fan engine will also be ensured in cases, in which the flow divider is damaged, since the separated parts will pass the vane passages and will not block the vane arrays. Complete detachment of the flow divider by extreme forces, as produced by impinging foreign objects, will not occur as the flow divider, in the worst case, will disintegrate into a multitude of individual parts.

Preferably, the separable part of the flow divider is separated from the flow divider at the predetermined breaking points and forms a separated part. Thus, provision is made for the separation of parts in the required maximum size.

In particular, the at least one separated part of the flow divider is passed by aerodynamic energy through the vane passages of the core air duct and/or the secondary air duct. It is thus avoided that individual separated parts disturb the flow in the fan engine and/or affect rotation of the rotor blades.

Figure 1B:
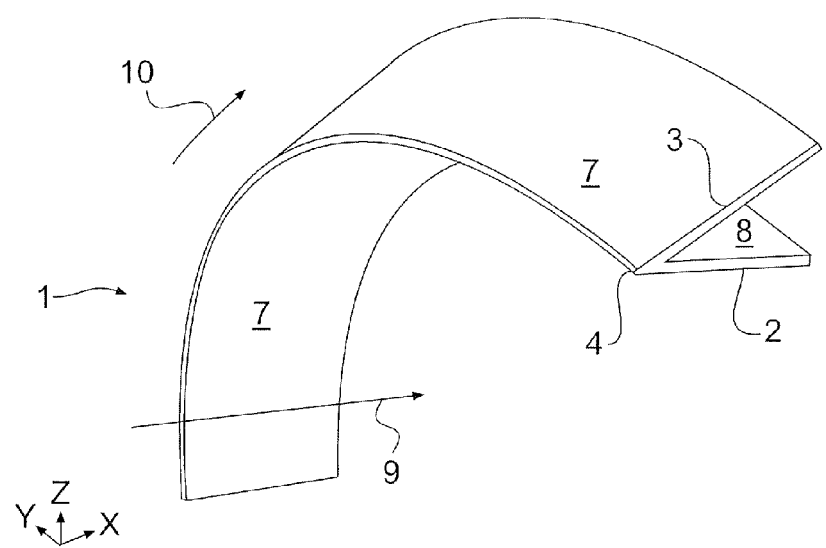
Figure 2A:
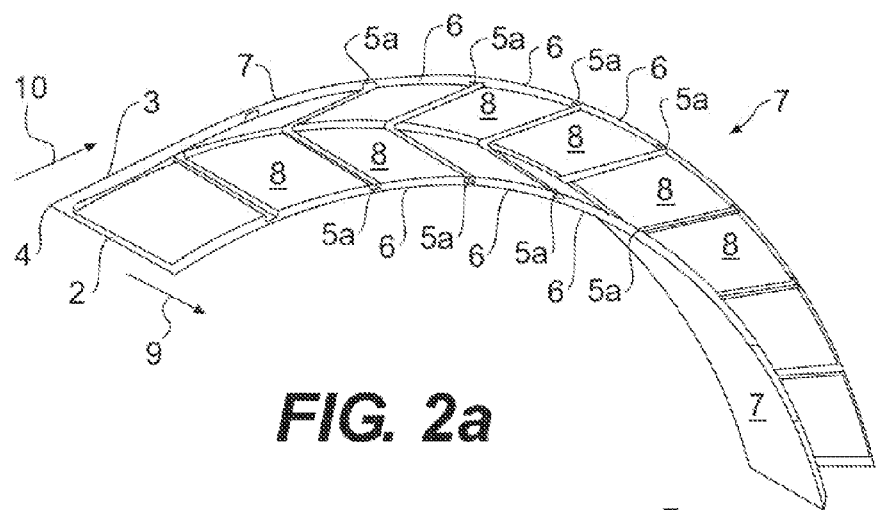
Figure 2B:
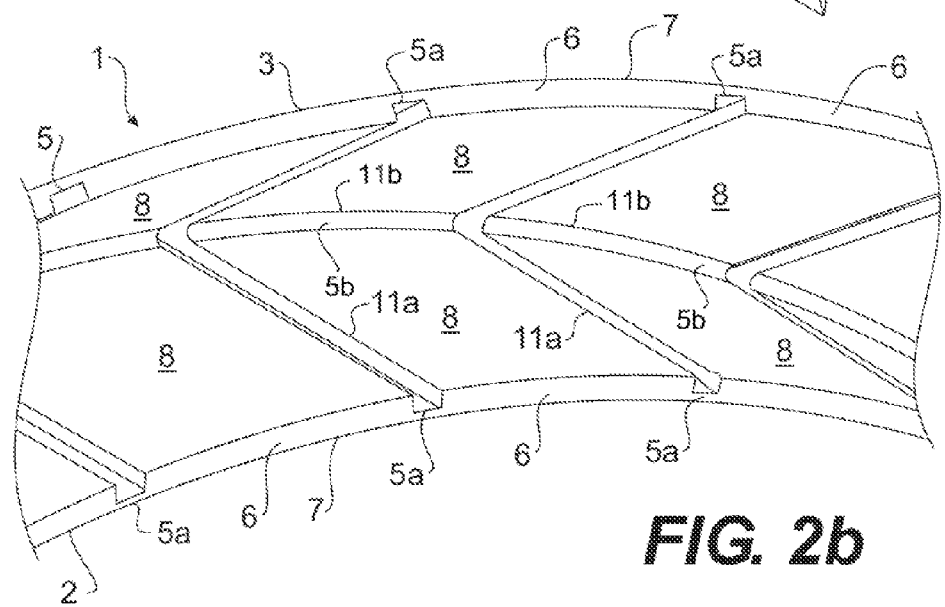
Figure 2C:
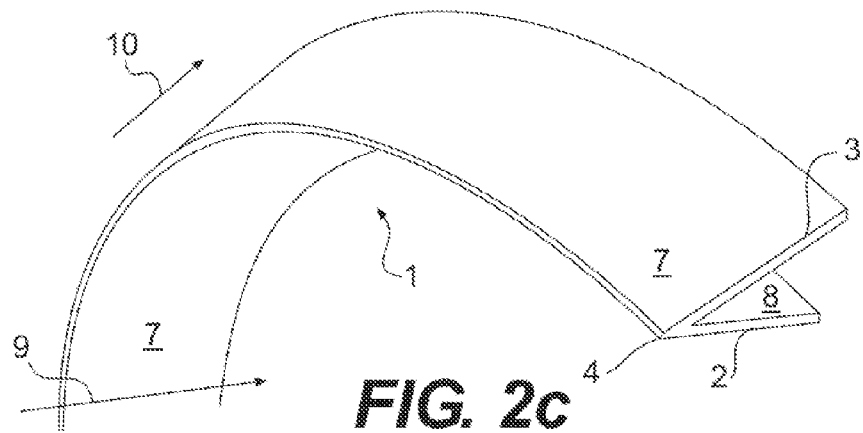

The state of the art and an embodiment of the present invention are more fully described in the following in light of five figures:

FIG. 1a is a perspective view of a section of a flow divider in accordance with the state of the art, seen from the inside, FIG. 1b is a perspective view of the section of the flow divider as per FIG. 1a, seen from the outside, FIG. 2a is a perspective view of a section of a flow divider in accordance with the present invention, seen from the inside, FIG. 2b is an enlarged detail view of the section of the inventive flow divider in FIG. 2a, and FIG. 2c is a perspective view of the section of the inventive flow divider in FIG. 2a, seen from the outside.

FIGS. 1a and 1b show a circumferential section of a flow divider 1 according to the state of the art. The flow divider 1 has a core air flank 2, a secondary air flank 3 and a leading edge 4. Also shown are a core airflow 9 and a secondary airflow 10.

The flow divider 1 according to FIGS. 1a and 1b is of annular design and has a V-shaped cross-section, with the V-shaped cross-section being formed by the core air flank 2 and the secondary air flank 3. The core air flank 2 and the secondary air flank 3 meet at the tip of the V-shaped cross-section and form the leading edge 4. At its V-shaped cross-section, the flow divider 1 has an outer surface 7 and an inner surface 8.

In operation, the flow divider 1 splits an entering annular airflow at the leading edge 4 into the core airflow 9 and the secondary airflow 10. The core airflow 9 and the secondary airflow 10 are also annular. The core airflow 9 passes along the core air flank 2, while the secondary airflow 10 passes along the secondary air flank 3. Thereafter, the core airflow 9 enters the core air duct, which is not shown, and the secondary airflow 10 the secondary air duct, which is likewise not shown, of the fan engine.

FIGS. 2a, 2b and 2c show a section of a flow divider 1 in accordance with the present invention. The flow divider 1 is provided with a core air flank 2 and a secondary air flank 3.

In accordance with FIGS. 2a and 2b, the flow divider 1 furthermore includes first grooves 11a and second grooves 11b, first predetermined breaking points 5a and second predetermined breaking points 5b as well as separable parts 6.

FIGS. 2a and 2c also show a leading edge 4. Furthermore a core airflow 9 and a secondary airflow 10 are represented.

The flow divider 1 according to FIGS. 2a, 2b and 2c is of annular design and has an essentially V-shaped cross-section, with this cross-section being formed by the core air flank 2 and the secondary air flank 3. The core air flank 2 and the secondary air flank 3 meet at the tip of the V-shaped cross-section and form the leading edge 4 (cf. FIGS. 2a and 2c).

The flow divider 1 has a smooth outer surface 7 (cf. FIG. 2c) and a subdivided inner surface 8 (cf. FIGS. 2a and 2b). Shown on the inner surface 8 are the parallel extending first grooves 11a which are equidistantly arranged in direction of the core airflow 9 and the secondary airflow 10. By use of these first grooves 11a, the first predetermined breaking points 5a in the flow divider 1 are provided on the core air flank 2 and the secondary air flank 3. The second grooves 11b extend on the inner surface 8 circumferentially along the junction of the core air flank 2 and the secondary air flank 3, so that the second predetermined breaking points 5b are provided on the leading edge 4. The first grooves 11a and the second grooves 11b or the first predetermined breaking points 5a and the second predetermined breaking points 5b, respectively, limit the size of the separable parts 6.

In operation, the flow divider 1 splits an entering annular airflow at the leading edge 4 into the core airflow 9 and the secondary airflow 10. The core airflow 9 and the secondary airflow 10 are also annular. The core airflow 9 passes along the core air flank 2, while the secondary airflow 10 passes along the secondary air flank 3. Thereafter, the core airflow 9 enters the core air duct, which is not shown, and the secondary airflow 10 the secondary air duct, which is likewise not shown, of the fan engine.

The entering annular airflow often entrains foreign objects into the fan engine not shown which impinge upon the flow divider 1. In the process, the flow divider 1 may be damaged, so that differently sized fragments are produced in the state of the art which are likely to block the vane array of the core and secondary air ducts not shown.

However, on the flow divider 1 as per FIGS. 2a to 2c of the present invention, only the separable parts 6 of the size defined by the first and second predetermined breaking points 5a and 5b will be separated from the flow divider 1. The separated parts are transported with the core airflow 9 and/or the secondary airflow 10 through the fan engine not shown. The size of the separated parts is here dimensioned such that they are capable of passing the vane passages, which are not shown, of the core and secondary air ducts, which are likewise not shown.

The smooth outer surface 7 of the flow divider 1 enables the continuity of the outer profile layer of the flow divider 1 to be maintained, so that the aerodynamic quality of the flow divider 1 is not impaired.

List of Reference Numerals
    01 Flow divider
    02 Core air flank
    03 Secondary air flank
    04 Leading edge
    05a First predetermined breaking point
    05b Second predetermined breaking point
    06 Separable part
    07 Outer surface
    08 Inner surface
    09 Core airflow
    10 Secondary airflow
    11a First groove
    11b Second groove

What is claimed is:

1. A flow divider for a fan engine, comprising:
an annular leading edge positioned between an outer circumference of an annular core air duct and an inner circumference of an annular secondary air duct and protruding into a fan airflow;
separable parts which, whatever their orientation, can pass vane passages of the core air duct and the secondary air duct, the flow divider having an aerodynamic profile; and
a breaking structure including at least one groove having a circumferential component for axially separating the separable parts of the flow divider from one another; the breaking structure also having at least one groove extending at an angle to the at least one groove having the circumferential component for separating the separable parts of the flow divider into ring segments, wherein the at least one groove defines a predetermined breaking point.

2. The flow divider of claim 1, wherein the predetermined breaking points are by which the separable parts are limited and a size of the separable parts is defined.

3. The flow divider of claim 2, wherein the predetermined breaking points are arranged essentially along a direction of the fan airflow.

4. The flow divider of claim 2, wherein the predetermined breaking points are arranged essentially at an angle to a direction of the fan airflow.

5. The flow divider of claim 4, wherein the flow divider has an essentially V-shaped cross-section, and the predetermined breaking points are arranged on an inner surface of the V-shaped cross-section.

6. The flow divider of claim 5, wherein the flow divider is made of a fiber-composite material.

7. The flow divider of claim 5, wherein the flow divider is made of a plastic material.

8. The flow divider of claim 2, wherein the predetermined breaking points are arranged essentially along a direction of the fan airflow.

9. The flow divider of claim 2, wherein the predetermined breaking points are arranged essentially at an angle to a direction of the fan airflow.

10. The flow divider of claim 1, wherein the flow divider has an essentially V-shaped cross-section, and the predetermined breaking points are arranged on an inner surface of the V-shaped cross-section.

11. The flow divider of claim 1, wherein the flow divider is made of a fiber-composite material.

12. The flow divider of claim 1, wherein the flow divider is made of a plastic material.

13. The flow divider of claim 1, and further comprising:
a core air flank connected to a first side of the annular leading edge and extending away from the annular leading edge for guiding airflow to the core air duct;
a secondary air flank connected to a second side of the annular leading edge opposite the first side and extending away from the annular leading edge for guiding airflow to the secondary air duct;
the breaking structure including at least one groove running adjacent the annular leading edge for separating circumferentially corresponding portions of the core air and secondary air flanks; the separable parts including at least one chosen from the circumferentially corresponding portions of the core air and secondary air flanks.

14. The flow divider of claim 13, wherein the breaking structure is positioned on an inner surface of the annular leading edge away from the fan airflow and running circumferentially around the flow divider.

15. The flow divider of claim 1, wherein the breaking structure includes a plurality of interconnected grooves on an inner surface of the flow divider for separating the separable parts.

16. The flow divider of claim 15, wherein at least certain of the grooves extend from the annular leading edge to a trailing edge of each of the outer circumference and the inner circumference.

17. A method for increasing an operational safety of a fan engine, comprising:
providing a flow divider having:
an annular leading edge positioned between an outer circumference of an annular core air duct and an inner circumference of an annular secondary air duct and protruding into a fan airflow; and
separable parts which, whatever their orientation, can pass vane passages of the core air duct and the secondary air duct; and
detaching at least one defined, separable part of the flow divider upon entry of at least one foreign object into the fan engine and impingement of the foreign object on the flow divider, the detaching including axially separating the at least one defined separable part from the flow divider at a predetermined breaking point, and also separating the at least one defined separable part from the flow divider as a ring segment at a predetermined breaking point.

18. The method of claim 17, and further comprising passing the at least one separated part by aerodynamic energy through the vane passages of at least one of the core air duct and the secondary air duct.

19. The method of claim 17, and further comprising passing the at least one separated part by aerodynamic energy through the vane passages of at least one of the core air duct and the secondary air duct.

20. The method of claim 17, and further comprising providing the flow divider with:
a core air flank connected to a first side of the annular leading edge and extending away from the annular leading edge for guiding airflow to the core air duct;
a secondary air flank connected to a second side of the annular leading edge opposite the first side and extending away from the annular leading edge for guiding airflow to the secondary air duct;
a breaking structure running adjacent the annular leading edge for separating circumferentially corresponding portions of the core air and secondary air flanks; the separable parts including at least one chosen from the circumferentially corresponding portions of the core air and secondary air flanks.

21. The method of claim 17, and further comprising positioning the breaking structure on an inner surface of the annular leading edge away from the fan airflow and running circumferentially around the flow divider.

22. The method of claim 21, wherein the breaking structure includes a groove that defines the predetermined breaking point.

23. The method of claim 17, and further comprising separating the separable parts by at least one groove on an inner surface of the flow divider.

24. The method of claim 17, and further comprising separating the separable parts by a plurality of interconnected grooves on an inner surface of the flow divider.

25. The method of claim 24, and further comprising providing that the grooves extend from the annular leading edge to a trailing edge of each of the outer circumference and the inner circumference.

* * * * *